United States Patent Office 3,012,966
Patented Dec. 12, 1961

3,012,966
PETROLEUM HYDROCARBON COMPOSITIONS
Joseph P. Copes, Easton, Pa., Raymond L. Mayhew, Phillipsburg, N.J., and Earl P. Williams, Pen Argyl, Pa., assignors to General Aniline & Film Corporation, New York, N.Y., a corporation of Delaware
No Drawing. Filed June 24, 1958, Ser. No. 744,042
6 Claims. (Cl. 252—34)

The present invention relates to petroleum hydrocarbon compositions containing alkylphenoxybutyric acid and salts thereof as thickening or gelling agents, and as corrosion inhibitors of iron and steel.

It is known that various materials have been used and are still used as thickening agents for various fluid mediums. Many of the thickening agents are of natural origin, such as natural gums, shellac, chicle, arabic, benzoin, myrrh, tragacanth, alginates, locust bean, sandarac, agar-agar, zanzibar, damar, camphor, rubber, olibanum, karaya, starch, gelatin and starch and many other too numerous to mention. Various synthetic materials are also employed. Many, but not all of these have been polymeric in nature. While some are merely chemical modifications of the natural polymers, such as for example, sodium carboxy methyl cellulose, others are more remote from types obtainable in nature, such as polyvinyl alcohol, polybutene, polyvinyl pyrrolidone, etc.

Another class of miscellaneous thickening agents which are not polymeric in nature include petroleum sulfonate-alkali hydroxide-water system; stearic acid with isobutyl methacrylate, calcium oxide and water; polybasic acids and amines in alkyd modified resins and various soaps.

The use of soaps as thickening agents has been known for a long time. The soaps are usually derived from natural fats such as tallow, lard, mutton fat, and oils such as palm oil, castor oil, coconut oil, cottonseed oil, tall oil, and these fats and oils are treated to form the metal salt of the fatty acid residue part of the molecule. These soaps are usually of longer, straight chain fatty acids and the metals of which they are the salts are usually alkali metals or alkali earth metals, but may also be various other metals such as lead, and the choice of the metal, as well as the choice of the fatty acid, will be governed considerably by the desired characteristics of the thickened material. Thus, if a grease should be desired with certain low temperature characteristics, an entirely different soap would be employed than if a slightly thickened oil were desired for high temperature work. Numerous other considerations influence the selection of the thickening agent, such as the general physical and chemical nature of the material to be thickened, solubility, economics, thickness, stability to the various influences such as heat, light, age, etc.

The manner in which thickening and gelling agents operate is not fully understood in all cases. It can be appreciated that polymeric molecules form gels and thick solutions through a physical entrainment of the solvent and an entanglement of the large molecules. One might think of a solution of a polymer as a series of swollen molecules. Since the components of each large molecule are joined by chemical bonds, these are relatively stable to shearing forces and the like. The use of these materials is usually cumbersome because heating is usually required and the process is relatively slow. Many of the gels formed are rather temperature sensitive, the gel being lost when the temperature is raised.

The soaps have been studied in some detail and it has been found that there is an association of molecules when the gel is formed. The molecules in association form into threadlike configurations and act as minute fibres in the liquid, thereby forming the thickeners. The association of the molecules is not considered chemical in the usual sense of the word, but perhaps more related to the interaction of dipoles or coordination phenomena. The nature assumed by the orienting molecules, and consequently the nature of the gel or thickened material resulting, will depend very much on the manner in which the orienting occurred. The usual practice is to add such thickening agents to the material to be thickened and to heat to some point where a high degree of disorientation occurs; then by a process of skillful cooling, manipulation, shearing and intermediate ageing, to achieve the desired nature in the product. Materials thickened in this manner are greases, lubricants, cosmetics, incendiary materials and many others. These are characterized by a certain degree of thixotrophy and the high temperature characteristics of many are not good, although certain examples are satisfactory at fairly high temperatures.

It is believed that a number of the miscellaneous group operate in similar fashion to the soaps in that, by a process of association and aggregation, the molecules, due to dipole attraction, form polymer-like structures which, through a process of solvation and entrainment and entanglement, do add thickness and gelation to the system. Many of these require specialized equipment and skill to prepare the thickened result. One of the worst is the case where one carries out the complicated thickening process which at the critical stage seems to proceed rapidly and which requires complicated testing to estimate the thickening. It would seem that slight errors or delay would permit the process to go too far to result in a satisfactory product. Other processes require heating, cooling, milling, shearing, masticating and other rigorous rigidly controlled procedures. Again, there are many limitations in the use of the products.

It is an object of the present invention to provide a new petroleum hydrocarbon composition which has several industrial applications and which does not require, in the preparation thereof, milling, shearing, masticating or other rigidly controlled procedures.

Other objects and advantages will become more clearly evident from the following description.

The above and other objects of the present invention are readily accomplished by adding to any liquid petroleum hydrocarbon 0.1 to 10% of an alkylphenoxy butyric acid or a salt thereof having the following general formula:

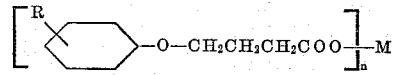

wherein R represents an alkyl group containing from 6 to 10 carbon atoms, e.g., hexyl, isohexyl, heptyl, octyl, nonyl and decyl, M represents hydrogen, a mono- or di-valent alkali and alkali earth metal of groups I–A and II–A of the periodic table such as sodium, potassium, lithium, barium, calcium, magnesium, strontium, etc., or an organic amine salt forming compound, e.g. any basic aliphatic, aromatic or heterocyclic amine such as, for example, diethanolamine, morpholine, diethylene triamine, 2,5-dimethyl piperazine, benzylamine, cyclohexylamine, dicyclohexylamine, methylamine, ethyl-, propyl-butyl-amine, dimethylaniline, 2-aminopyridine, etc., and n represents an integer of from 1 to 2.

The compounds utilized as corrosion inhibitors of iron and steel and thickening or gelling components, in accordance with the present invention, are obtained by the reaction of 1 mole of an alkylated phenol containing from 6 to 10 carbon atoms in the alkyl group with 1 mole of γ-butyrolactone at a temperature of 80–95° C. in the usual manner. In lieu of γ-butyrolactone, the alkylated phenol may be reacted with γ-chlorobutyric acid. In either case, 1 mole of the alkylated phenol and 1 mole of either γ-butyrolactone or γ-chlorobutyric acid is refluxed with or without the presence of benzene as a solvent-diluent for a period of time ranging from 2 to 4 hours. The resulting product which is obtained in acidic form and containing one ionizable hydrogen atom is readily converted into a salt by neutralization with a suitable base, such as caustic soda, caustic potash, lithium hydroxide, barium hydroxide, magnesium hydroxide and hydroxides of the alkali and alkali earth metals of groups I–A and II–A of the periodic table or with any one of the previously mentioned basic organic amines. In the case of γ-butyrolacetone, the alkylated phenol may be condensed therewith in the form of an alkali or alkali earth metal phenolate under substantially anhydrous conditions.

As examples of the salts of alkylphenoxybutyric acid which have been prepared in accordance with the foregoing procedures and which may be utilized as thickening or gelling agents, the following are illustrative:

(1) $\left[ C_9H_{19}-\langle\rangle-O(CH_2)_3COO \right]_2 Ba$ (2) $\left[ \begin{array}{c} C_9H_{19} \\ | \\ \langle\rangle-O(CH_2)_3COO \end{array} \right]_2 Ca^{++}$ (3) $C_9H_{19}-\langle\rangle-O(CH_2)_3COONa$ (4) $\left[ \begin{array}{c} C_6H_{13} \\ | \\ \langle\rangle-O(CH_2)_3COO \end{array} \right]_2 Mg^{++}$ (5) $\left[ C_7H_{15}-\langle\rangle-O(CH_2)_3COO \right]_2 Ca^{++}$ (6) $C_{10}H_{21}-\langle\rangle-O(CH_2)_3COOK$ (7) $\begin{array}{c} C_8H_{17} \\ | \\ \langle\rangle-O(CH_2)_3COOLi \end{array}$ (8) $\left[ C_9H_{19}-\langle\rangle-O(CH_2)_3COO \right]_2 Sr^{++}$ (9) $\left[ C_8H_{17}-\langle\rangle-O(CH_2)_3COO \right]_2 Ba^{++}$

(10) $\left[ C_9H_{19}-\langle\rangle-O(CH_2)_3COO \right]_2 Mg^{++}$

The thickening or gelling agents characterized by the foregoing general formula, including the organic amine salts which are illustrated hereinafter, are employed in any petroleum liquid hydrocarbon which has a boiling point from about 40° C. to 400° C. The liquid petroleum hydrocarbon may be either of paraffinic or naphthenic original or mixtures thereof, such as for example, petroleum ether, gasolene, gas, oil, naphthas, mineral spirits, crude kerosene, kerosene distillates, kerosene oils, furnace oil and light mineral and lubricating oils of various types having a Saybolt viscosity of 50 to 2,000 at 100° F. In addition to these, hydrocarbons obtained from the distillation of coal and wood may also be thickened or gelled. The amount of thickening or gelling agent to be employed may range from 0.1 to as high as 10% based on the weight of the liquid hydrocarbon and may vary between this range depending upon the type of character of the liquid hydrocarbon used. In the majority of cases we have found that an amount ranging between 1 and 5% is generally sufficient to impart satisfactory gelling or thickening characteristics.

The thickening of gelling agents are merely dissolved in the liquid hydrocarbon to yield a gel. The gel may also be produced by first making a solution of the gelling agent and liquid hydrocarbon and then cycling through a heating and cooling procedure. The preferred method however, is to bring the liquid hydrocarbon and the gelling agent together by the application of heat until the system is homogeneous and of low fluid viscosity and then the system is allowed to cool to room temperature. This results in a thixotropic gel of suitable character which is useful in a wide variety of applications, such as light greases, thickened lubricants and incendiary materials of the Napalm type. Instead of effectuating the gelling or thickening by heating and cooling, the thickening agents may be simply added to the liquid hydrocarbon and the mixture allowed to age for a short time to yield a thickened composition. In other words, the thickening agent may be added without heating and even without stirring to a liquid hydrocarbon and the mixture allowed to stand at room temperature from 1 to 12 days at which time the thickened or gelled hydrocarbon mixture is obtained. This is rather surprising and unexpected and definitely obviates the shortcomings attended with the miscellaneous groups of thickeners referred to above. We also unexpectedly find that the composition acts as a corrosion inhibitor, i.e. inhibits rusting of ferrous metals.

The thickened or gelled hydrocarbon compositions prepared in accordance with the present invention may also be employed as slushing compounds, as protective coatings, such as in paints and varnishes, in the thickening of cosmetics, such as cold creams, vanishing creams, printing inks, lipsticks and particularly in the making of waxes and polishes.

The following working examples will illustrate the manner in which the thickening or gelling agents are employed. It is to be understood that these examples are merely illustrative and are not to be construed as limiting the scope of the invention claimed.

EXAMPLE I

Parts by weight
Crankcase type lubricating oil having an initial boiling point of 375° C. _____ 97
Product of illustration (1) _____ 3

The mixture was heated to 90° C. and agitated. The result was a cloudy solution. This was allowed to cool to room temperature to yield a cloudy stiff gel of suitable consistency for use either as a grease or an incendiary material in bombs, flame throwers and the like. The gel is thixotropic and adheres to wood, soil, stone, metal, concrete and practically all other surfaces.

EXAMPLE II

The product of illustration (2) was dissolved at 0.5% and 2% in a white mineral oil by heating to 90° C. followed by cooling to room temperature. The mineral oil initially had a specific gravity of 60° F. of 0.834–0.845, a pour point of 30° F. and a flash point of 355° F. The cooled samples each were in gel form and adaptable for use as petrolatums in the pharmaceutical industry.

EXAMPLE III 5 parts by weight of the product of illustration (2) were dissolved in 95 parts by weight of petroleum ether at the boiling point thereof, i.e. 90–100° C. After cooling to room temperature, a firm gelled structure was obtained which is particularly adaptable as an incendiary in bombs.

EXAMPLE IV

Example III was repeated with the exception that the calcium salt of illustration (2) was replaced by the same amount of the barium salt of illustration (1) with identical results.

EXAMPLE V

The sodium salt of illustration (3) was dissolved in 0.5% and 2% concentration in petroleum ether at the boling point thereof, i.e. 90–100° C. During stirring of the two samples they became very gelatinous and upon cooling to room temperature, each existed as a clear, firm, thixotropic gel.

EXAMPLE VI

The product of illustration (4) was dissolved in kerosene at 2% concentration. A slight warming hastened the solution. Upon cooling an immediate thickening took place.

EXAMPLE VII

Example VI was repeated with the exception that the product of illustration (4) was replaced by the same amount of the product of illustration (5).

EXAMPLE VIII

The product of illustration (6) is added at 3% by weight level to gasolene. This was heated gently on a steam bath to approximately 35° C. and cooled immediately to room temperature. Upon cooling a clear thixotropic gel was formed. Upon agitation the gel was somewhat reduced in thickness but upon standing again at room temperature for 30 minutes regained its full gelled nature.

The same system as above was compounded but no heating was applied. As time went on the solid matter begin to swell and became gellacious.

The same system was again compounded but no heat applied. Instead the system was agitated by rolling. The solids swelled and a fine gel was produced.

This example clearly illustrates the various ways in which gels of the present invention may be prepared.

The thickening or gelling agents utilized in accordance with the present invention have an outstanding advantage over all other incendiary agents in that no animal or vegetable fats are required in their manufacture. Another unusual feature is that the thickening or gelling agents do not corrode metallic containers in which they are stored. In fact they prevent rusting of ferrous metals, as will be subsequently shown.

In addition to the metal salts of the periodic groups I-A and II-A, salts formed by the neutralization of the acidic hydrogen of the alkylphenoxybutyric acid with a stoichiometrical amount of a basic organic amine, as previously noted, such as diethanolamine, morpholine, diethylene triamine, 2,5-dimethyl piperazine, etc., are excellent inhibitors of corrosion of ferrous metals, i.e. iron and steel. The various salts display varying solubilities. Thus the lithium, sodium, morpholine, diethanolamine salts are soluble in water; the acid itself and very many other salts such as the n-phenyl morpholine, the morpholine, the diethylenetriamine salts are soluble in such organic liquids as petroleum hydrocarbons.

The inhibitor, particularly the nonylphenoxybutyric acid or its salts, may be used by dissolving in a suitable solvent (water and liquid hydrocarbons) and applying in a manner similar to the application of a coat of shellac, or as a slushing compound or as a coat of paint. The inhibitor may be added to the liquid in a container, such as seagoing tankers, tanks, pots, kettles, pipe, pipeline, reaction vessel, still, settling basin, conduit, cooling tower, aqueduct, boiler, etc., and many others for the prevention of corrosion.

The exact manner in which the corrosion is prevented is not understood, it is felt that the nature of the molecular species is such that films, such as monomolecular films are found on the surface of the metal, and the films thus formed prevent corrosion either through the barrier thus formed to the corrosive elements, or through some manner of passivation such as the occupation of reaction centers, or, if none of these, through the presentation of hydrophobic film which repels the water and oxygen which would otherwise cause corrosion, or some other mechanism not known to the discoverers of the inhibitors.

In order to show the effectiveness of the alkylphenoxy butyric acids and various salts thereof as corrosion inhibitors, the following tests were conducted:

Test A

The test is conducted by turning a log of mild steel in a lathe using a cutting tool with chipbreaker. The chips fall into solutions of the inhibitor which are then drained away. The chips are then stored in a humidity cabinet which cycles through 100% relative humidity at 55° C. every 2 hours. The time required for a predetermined degree of rustiness is counted by inspecting the chips periodically.

Test B

This is the Baker-Jones-Zisman drop test described in Ind. Eng. Chem. 40, 2338 (1948), and 41, 137 (1949): a standard prepared, polished, indented usually 1010 steel test specimen is introduced under the surface of the hydrocarbon-inhibitor system under scrutiny, and a drop of distilled water is placed in the indention. The system is held at 60° C. for 48 hours. The test is failed if any visible signs of rust is notable at the end of the test. The test is passed if no rust or stain is visible.

EXAMPLE IX

Nonylphenoxy butyric acid was used in Test A in 2% and 0.5% concentration in both low (90–100° C.) and high (375° C.) boiling petroleum hydrocarbons. All solutions were clear. All the chips lasted for more than 7 days. When no inhbitor is present the duration is a matter of minutes, usually much less than one cycle.

EXAMPLE X

Various salts were tested using Tests A and B with the following results:

| Salt of nonylphenoxy butyric acid | Test A Duration, Days | | | | Test B | |
|---|---|---|---|---|---|---|
| | low boiling hydrocarbon | | high boiling hydrocarbon | | | |
| | 2% | 0.5% | 2% | 0.5% | 2% | 0.5% |
| diethanolamine | 2 | 2 | 8 | 8 | p | p |
| morpholine | 7 | 7 | 8 | 8 | p | p |
| N-(3-aminopropyl) morpholine | 8 | 5 | 8 | 8 | p | p |
| N-phenyl morpholine | 5 | 3 | 8 | 5 | p | p |
| N-(2-hydroxy ethyl) morpholine | 8 | 2 | 8 | 8 | p | p |
| 2,5-dimethyl piperazine | | | 8 | 8 | p | p |
| diethylene triamine | 7 | 7 | 3 | 2 | p | p |

| | water | |
|---|---|---|
| | 2% | 0.5% |
| diethanolamine | 8 | 8 |
| morpholine | 8 | 2 |
| N-(3-aminopropyl) morpholine | 8 | 5 |
| sodium salt | 8 | 8 |
| lithium salt | 8 | 5 |

The test was usually terminated at 8 days. Thus the figure "8" in the table may be construed to mean "at least 8 days."

It is believed that the structural detail of the molecule is more related to the butyric acid part than to the exact substituent to the butyric acid, because other chain lengths in the aliphatic acid part do not exhibit such inhibition, but certain other related butyric acids do, as for instance dinonylphenoxy butyric acid and its salts behave in similar fashion, affording quite good protection, whereas almost all such analogous acetic acids tried were relatively ineffective in preventing rust in the Tests A and B above when tested in hydrocarbons as above or aqueous media is below:

Capri toluene sulfonamide acetic acid
Dodecylbenzene sulfonamide acetic acid
Benzene sulfonamide acetic acid
Nonylphenoxy methyl-2-thiirone
3-nonylphenoxy-2-hydroxy propyl trimethyl ammonium chloride
Nonylphenoxy methyl-2-ethyleneoxide
3-pentadecylphenoxy acetic acid
N-cyclohexyl-γ-hydroxy-butyramide From the foregoing tests, it is obvious that the butyric acid is the compelling feature in the tailoring of the rust inhibitors, although of course, the unique features stem from the entire molecule.

The inhibitors may be used, as set forth above, as a constituent of the liquid in contact with the metal to be protected, or as a constituent of a film to remain, perhaps as a residue of evaporation, or as a non-evaporating film, such as a grease, oil, gel, syrup, etc. to be applied as by doctoring, spraying, brushing, wiping, smearing, rubbing and the like. In all cases the underlying metal is protected from the rusting effects of the elements.

The inhibition provided is substantially equivalent to or better than the very best available inhibitors, and there is the added advantage of remarkable stability to heat, an objectionable feature of many other type inhibitors, such as many of the esters found on the market, and certain amines.

A further advantage is the solubility in water of a number of the salts mentioned; water-soluble, really good organic inhibitors are indeed rare.

Except for the metal salts, which can be avoided if necessary, the inhibitors deposit no residue upon combustion. This is a distinct advantage in many cases such as in internal combustion engines where ash would be a great deterrent in the use of inhibitors in gasoline or other fuel or in the lubricants, because of fouling, wear, afterglow, preignition, alteration of compression ratio, catalysis, friction, gumming, etc.

The inhibitors, so tenaciously film forming, are of merit in lubrication, especially as E.P. (extreme pressure) additives, a plus value of great importance. Thus there is a combination of versatility in solubility, absence of ash if required, extreme pressure possibilities, excellence of rust inhibition, all in a single unit.

A special application for these inhibitors is in the latex paint field. As is well known, such paints are not recommended by the manufacturers for use on metal due to rusting. It has now been found that such paints are considerably improved when the inhibitors of the present invention are added. In addition, steel immersed in the paint rusts and causes stains, thus changing the color of the paint. For example, several such commercial paints, when used on clean mild steel cause rusting, however when any of a large selection of the instant inhibitors are added to the paint in amounts of about 3% or more, rusting is eliminated below the surface of the liquid paint and considerably diminished or eliminated on the steel painted with the paint. Among the more outstanding agents are: the morpholine and substituted morpholine salts, the diethylene triamine and the sodium salts of nonylphenoxy butyric acid.

The organic amine and metal salts of the foregoing general formula are particularly adaptable as gelling agents in the hydraulic fracturing of oil well formations. As is well known in the art, petroleum occurs naturally in consolidated sandstone formations which usually lie beneath the surface of the ground. To recover the petroleum it is the practice to drill holes in the formation and allow the oil to escape through the hole to some convenient container. The petroleum does this driven by the pressure of its lower boiling constituents. On occasion it is necessary to provide impetus to the petroleum, and in these cases gas or water is introduced in order to drive the oil to the oil well and out, or to allow it to be pumped out.

There are certain difficulties which occur in this situation. For example, the formation may be composed of very small particles which render the flow of oil difficult. Again, there may occur certain clays which swell when water reaches them, and this may impede the flow of oil. Also, there may occur certain intentional or unintentional hindrances such as cement, drilling mud, casings, plugs, etc. which obstruct the flow of oil. Various influences may occur, the formation may become preferentially water wet in some regions, or oil wet; both water and oil commonly are produced together. In the case of injection wells the formation may become plugged because of the very large volumes of water, gas, etc. which must enter the formation through a relatively small area of drilled surface; even relatively clean water contains occasional particles of dust, products of wear and abrasion and corrosion which filter out and tend to plug up the interstices of the sandstone. Even bacteria may enter the picture.

Various devices exist for overcoming these situations. Acid may be used to dissolve particles of lime, corrosion products and various components of the formation, thereby opening new channels for the flow of oil. In addition, explosive charges may be detonated in the well which also open avenues of escape for the oil. It is possible to launch projectiles from the bore hole which penetrate obstacles and help the situation. Bactericides may be introduced. The number of treatments for oil wells is large.

One of the treatments which is currently finding favor is hydraulic fracturing. This is a procedure where the producing zone of the oil well is isolated by suitable plugs and then a slurry of liquid and solid is pumped into the well with sufficient pressure to rupture the formation. The cracks formed in this process are filled with the slurry being introduced and the solids introduced in this fashion prevent the cracks from closing after the operation is completed. The solid used is usually gravel or sand. The liquid used may vary considerably, but it is desirable that such liquid be sufficiently viscous or gelled to sustain the solid in suspension and translocate the solid to the ruptures in the formation. Gelling agents are usually added for this purpose. Means must also be available for removing the gelled liquid after its purpose is accomplished. It is desirable to use a hydrocarbon because an aqueous system may have deleterious effects on the formation.

The removal of the gelled liquid is usually effected by adding to it, before it is pumped into the formation, some ingredient which liquefies the gel. This procedure operates slowly so that the gel is not completely lost before its usefulness is over. It can readily be seen that this is not most efficient for some of the gel must be lost before the need for gel ceases. This may require the addition of excess gelling agent at the beginning to provide for loss and yet preserve sufficient thickening to suspend the solid. Again, a slow acting "neutralizer" must be used, and this may cause inconvenience and loss of production during the time the gel is liquefying. A further, very important disadvantage to known gelling agents commonly used is that each has a definite melting point, i.e. temperature at which the gel ceases to exist and the whole mass liquefies. Unfortunately, this temperature is below that found in many oil wells.

The fracturing compounds are prepared by forming a gel in a suitable liquid, i.e. any liquid petroleum hydrocarbon having a boiling point of 40° to 400° C., the most convenient being crude mineral oil although any of the fractions of petroleum are suitable. The gel may be prepared in a variety of ways, a convenient way being to admix the gelling agent and the hydrocarbon liquid and ageing until gelled. Mechanical agitation and/or application of heat will hasten the process as previously described.

The amount to use of the gelling agent will depend somewhat on the nature of the hydrocarbon to be gelled and the degree of thickening desired. The less viscous hydrocarbons are more desirable in this application, and when these are used, perhaps more gelling agent would be required than when more viscous liquids are employed. The size and density of the solids to be suspended also have a bearing on the degree of gelling required, the larger the size and the greater the density of the solids, the thicker the gel must be. As an approximation, from about 0.5% to about 5% of the gelling agent based on the weight of the hydrocarbon to be thickened would be a practical range, and it will probably be found that between 1% and 2% will be an average range for all ordinary circumstances.

The sand, gravel or other solid to be used in the fracturing process may be introduced at any time, but it seems appropriate to add it after the gel is formed. While it may be fed or metered in various ways, it seems simple to mix it in; the slurry is readily prepared and once prepared, is stable indefinitely.

The slurry is then pumped into the well using procedures well known, until the desired degree of fracturing has occurred. When the fracturing is completed, the gel is destroyed in one of two ways: either the water in the formation (connate water, etc.) is allowed to act or the gel, or water is introduced after the fracturing to act on the gel. The water destroys the gel during a finite time and allows the hydrocarbon to be withdrawn easily, without residual plugging of the formation, leaving the solids behind to maintain the cracks and ruptures caused by the operation. Thus the producing area (or the injection area) are greatly increased and the flow of liquid is less impeded.

It will be seen that there are several advantages to this system over the prior art: The gel has a high melting point. The gel is very efficient, i.e. not much agent is required. The gel is easily removed after its usefulness is gone. The gelling agent is entirely synthetic, no natural products are consumed. The gels are easily prepared.

EXAMPLE XI 3 parts by weight of the sodium salt of nonylphenoxy butyric acid (illustration 3) were added to 97 parts by weight of a petroleum fraction having a boiling range of 90–100° C. and stored at room temperature. As time went on the agent swelled, and a gel resulted. The gel was agitated with particles of 8 mesh silica. Upon standing, there was no evidence of settling out.

EXAMPLE XII

The gel of Example XI was admixed with water with agitation. After a few minutes, most of the gellation was lost and upon further agitation with water all of the gelled nature was lost.

This example clearly illustrates the suitability of the system for a fracturing compound; when the need for the gel is no longer present, the gel is readily and inexpensively destroyed. The system may then be removed as a liquid of low viscosity.

The gelling compounds of the present invention have an additional advantage in that they cause no corrosion to the metal components of the oil well casing, storage tanks, machinery, pumps, rigging, pipelines and the like, and afford protection against the deleterious effects of water and air in preventing the rusting of ferrous metals.

We claim:

1. A composition of matter consisting essentially of 90 to 99.9% of a liquid hydrocarbon having a boiling point range of from 40°–400° C. and from 0.1 to 10% of a gelling agent having the following general formula:

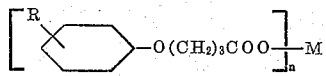

wherein R represents an alkyl group of from 6 to 10 carbon atoms; M represents a salt forming group selected from the class consisting of hydrogen, alkali metals of group I-A and alkaline earth metals of group II-A of the periodic table and basic organic amines selected from the class consisting of diethanolamine, morpholine, diethylene triamine, 2,5-dimethyl piperazine, benzylamine, cyclohexylamine, dicyclohexylamine, methylamine, ethyl-, propyl-butylamine, dimethylaniline and 2-aminopyridine, and $n$ represents a positive integer of 1 to 2.

2. A composition according to claim 1 wherein the gelling agent is the barium salt of nonylphenoxy butyric acid.

3. A composition according to claim 1 wherein the gelling agent is the calcium salt of nonylphenoxy butyric acid.

4. A composition according to claim 1 wherein the gelling agent is the sodium salt of nonylphenoxy butyric acid.

5. A composition according to claim 1 wherein the gelling agent is the morpholine salt of nonylphenoxy butyric acid.

6. A composition according to claim 1 wherein the gelling agent is the diethylene triamine salt of nonylphenoxy butyric acid.

References Cited in the file of this patent

UNITED STATES PATENTS

| | | |
|---|---|---|
| 1,920,160 | Bruson | July 25, 1933 |
| 2,110,847 | De Groote | Mar. 8, 1938 |
| 2,198,293 | Reiff et al. | Apr. 23, 1940 |
| 2,198,307 | Hope et al. | Apr. 23, 1940 |
| 2,612,473 | Morway et al. | Sept. 30, 1952 |
| 2,623,854 | Morway et al. | Dec. 30, 1952 |
| 2,690,429 | Morway et al. | Sept. 28, 1954 |